United States Patent [19]

Yerman

[11] Patent Number: 4,757,913
[45] Date of Patent: Jul. 19, 1988

[54] COVER UNIT FOR FOOD WARMER

[75] Inventor: Donald Yerman, Euclid, Ohio

[73] Assignee: Crescent Metal Products, Inc., Cleveland, Ohio

[21] Appl. No.: 30,891

[22] Filed: Mar. 26, 1987

[51] Int. Cl.[4] ............................................. B65D 43/20
[52] U.S. Cl. .................................................... 220/345
[58] Field of Search ............... 220/345, 346; 312/295, 312/298

[56] References Cited

U.S. PATENT DOCUMENTS 3,438,688  4/1969  Ferdinand et al. ................. 312/295

Primary Examiner—George T. Hall
Attorney, Agent, or Firm—Renner, Otto, Boissele & Sklar

[57] ABSTRACT

A cover unit for a food warmer of the type comprising a food container. The cover unit comprises a frame for connection to the food container, a plurality of door members slidably supported on the frame and independently movable relative to said frame and to each other selectively to close said opening and to allow a selected amount of access to the food container. A pair of track members are provided for supporting and guiding each of the door members, with the track members being selectively connectable and removable from the frame and from the door members, to enable assembly and disassembly of the frame, the track means and the door members. The key components of the cover unit, i.e., the door members, track members and frame are formed, essentially of sheet metal parts, to facilitate manufactue of those components.

10 Claims, 4 Drawing Sheets

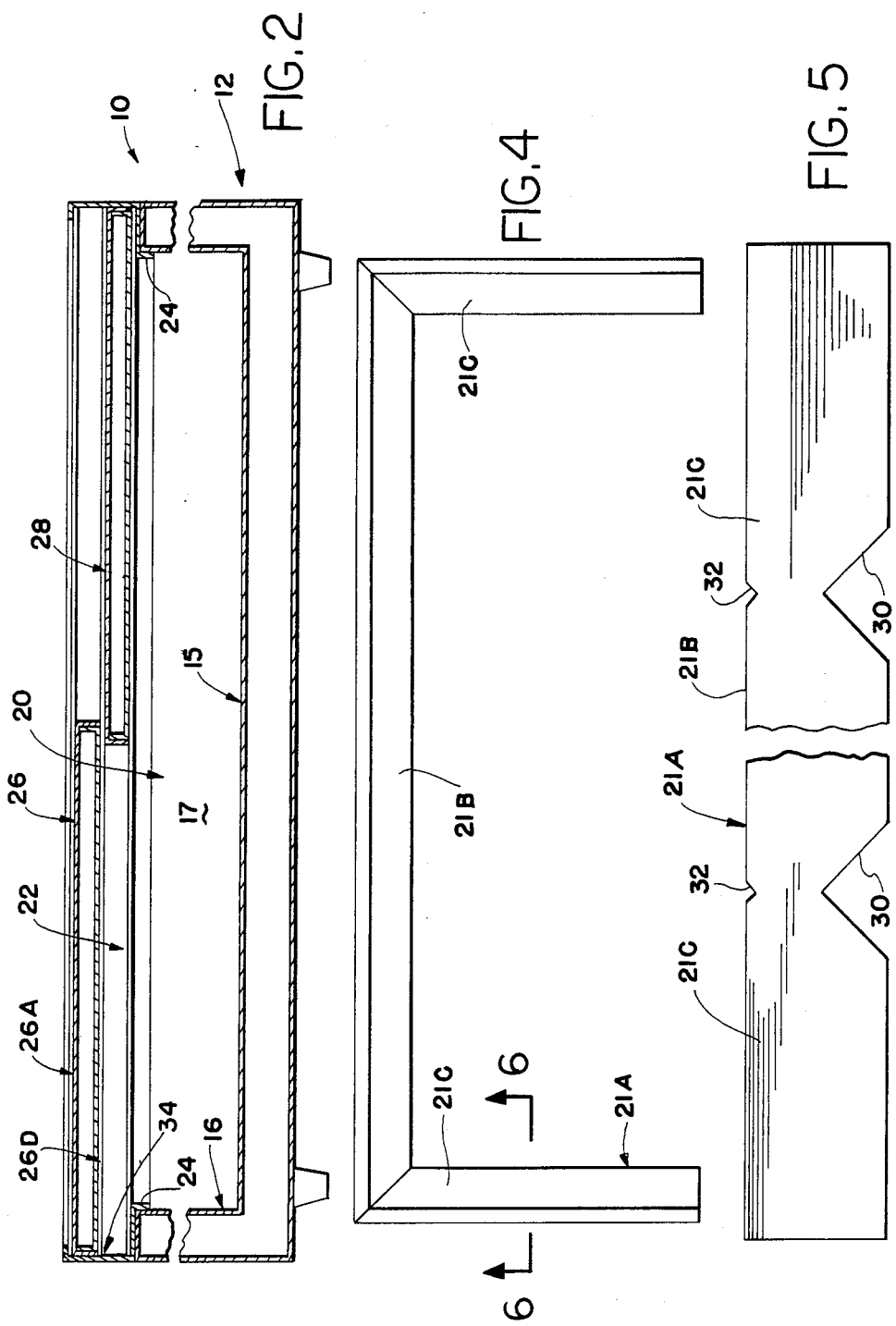

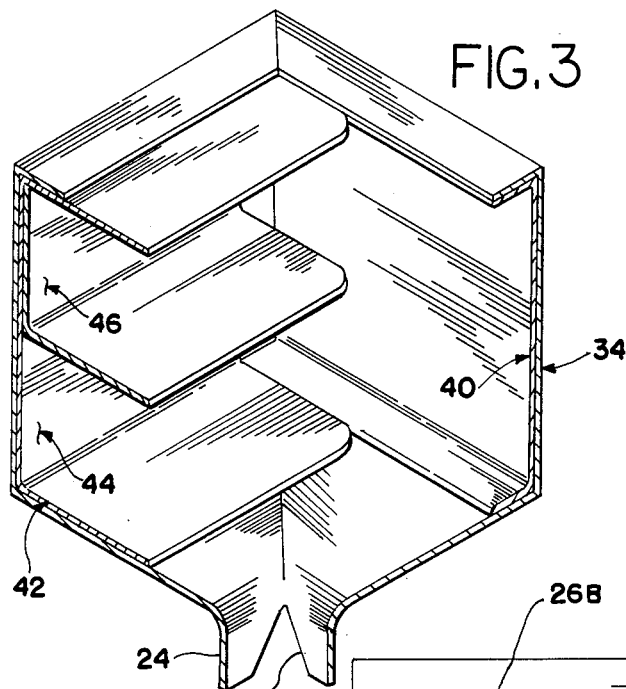
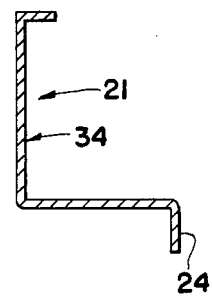
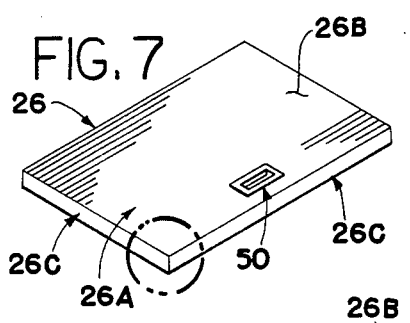
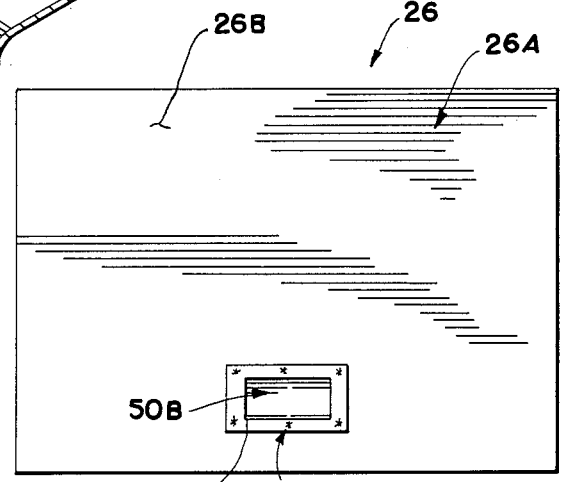
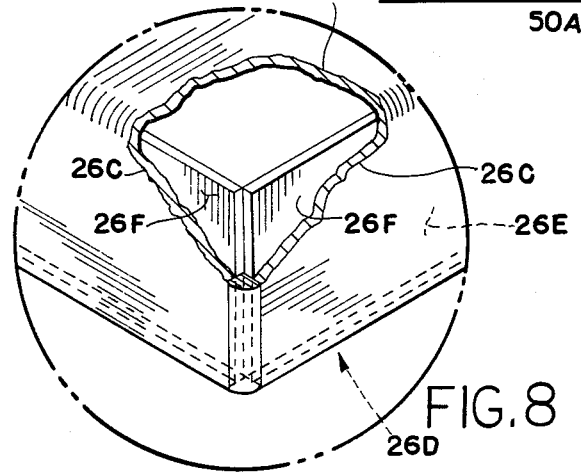

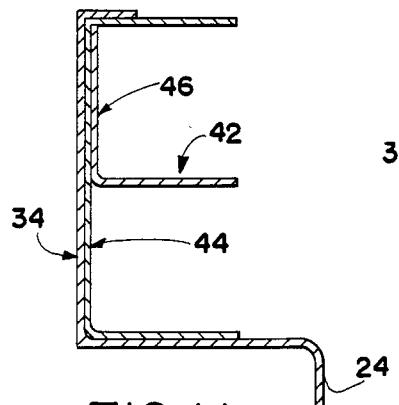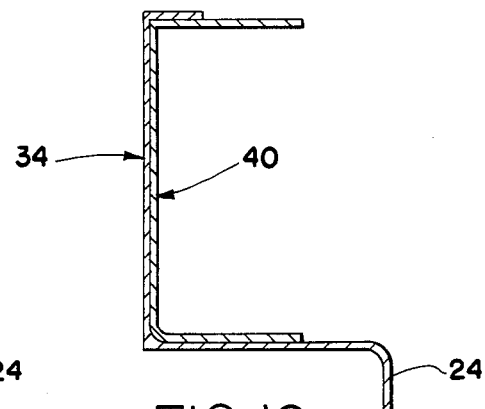

COVER UNIT FOR FOOD WARMER

FIELD OF THE INVENTION

The present invention relates to a cover unit for a food warmer container, and particularly to a cover unit which is designed to be efficiently fabricated and assembled and which can also be readily disassembled to allow cleaning of its component parts.

BACKGROUND OF THE INVENTION

In the food vending industry, food warming containers are commonly used for maintaining perishable foods at desired temperatures for periods of time. For example, in vending stands at sports stadiums and arenas food warming containers are used to maintain perishables such as hot dogs in a predetermined temperature range for a period of time. Additionally, food warming containers can also be used as mobile oven units, as shown in U.S. Pat. No. 3,521,030, for maintaining the temperature of perishable foods, during transport, for significant periods of time.

In the mobile oven unit shown in U.S. Pat. No. 3,521,030, there is a food compartment (container) with an access opening, and a cover unit for closing the access opening in the food compartment. The cover unit has a pair of pivotal doors for allowing selected access to the food compartment. The compartment walls include heating cables which can be energized from an external source (e.g., the vehicle's power source), and which transmit heat to the compartment's walls, to thereby effect heating of the food within the compartment.

In the applicant's experience, the type of cover structure disclosed in U.S. Pat. No. 3,521,030, i.e., a cover structure with pivotally mounted doors for allowing access to the food container, is typical of cover structures for the types of food warmers found at vending stands at stadiums and arenas. Typically such food warmers comprise a container with an access opening at its top, and pivotally mounted doors for allowing access to the interior of the container. The food warmer unit may or may not have a separate heating means, as shown in U.S. Pat. No. 3,521,030. From a health standpoint, it is important that key components of such food warming units be made of materials (e.g., stainless steels) which can be effectively cleaned to the extent required to comply with prevalent health rules and regulations.

SUMMARY OF THE INVENTION

The present invention provides a new and useful cover unit for a food warmer. The cover unit of the present invention is fabricated essentially of sheet metal (preferably stainless steel) parts, and is designed to be efficiently fabricated and assembled into the cover unit. Further, the design of the component parts also enables the cover unit to be readily disassembled to allow the parts to be cleaned. Additionally, the relative ease with which the component parts can be assembled into a cover unit encourages bulk shipment of the component parts and on-site assembly of those parts into cover units.

Unlike the pivotal cover units shown in U.S. Pat. No. 3,521,030, a cover unit according to the present invention includes a frame, a track assembly, and a pair of doors which are slidably supported by the frame and the track assembly in a manner enabling the doors to be individually manipulated, in order to allow access to selected portions of the food container. The basic components of the cover unit (i.e., the frame, track assembly and doors) are designed to be readily assembled into the cover unit, and readily disassembled so as to facilitate the cleaning of the components. Still further, the component parts of the cover unit of the present invention are made essentially of sheet metal (e.g., stainless steel), they are relatively simple in design, and relatively easy to fabricate and assemble into the cover unit.

It is thus an object of the present invention to provide a food warmer cover unit constructed of parts that are simple in design, easy to fabricate, and which facilitate assembly and disassembly of the cover unit.

It is another object of the present invention to provide a food warmer cover unit with doors which are slidably and removably supported on a frame, to enable selective access to a food container, and easy assembly and disassembly of the cover unit.

It is a still further object of the present invention to provide a food warmer cover unit formed essentially of sheet metal parts, and which avoids the need for metal hinges for the cover unit.

These and other objects of the present invention will become further apparent from the following detailed description and the accompanying drawings.

BRIEF DESCRIPTION OF THE DRAWINGS

FIG. 2 is a sectional view of a portion of a food warmer with a cover unit assembled therewith;

FIG. 3 is a three dimensional, perspective view of the corner of the cover unit of FIG. 1, taken from the area shown at 3—3, with the doors of the cover unit omitted;

FIG. 4 is a top plan view of a frame member for the cover unit of the present invention;

FIG. 5 is a flat plan view of a sheet metal member used to form the frame member of FIG. 4;

FIG. 6 is a sectional view of the frame member of FIG. 4, taken from the direction 6—6;

FIG. 7 is a three dimensional, perspective view of a door member for a cover unit according to the invention;

FIG. 8 is a three dimensional view of the corner of the door member of FIG. 7, shown at 8—8, with portions of the door member shown in section;

FIG. 9 is a top plan view of the door member of FIG. 7;

FIG. 10 is a sectional view of the cover unit of FIG. 1, taken along the line 10—10; and FIG. 11 is a sectional view of the cover unit of FIG. 1, taken along the line 11—11.

DETAILED DESCRIPTION OF THE PREFERRED EMBODIMENT

Figure 1:
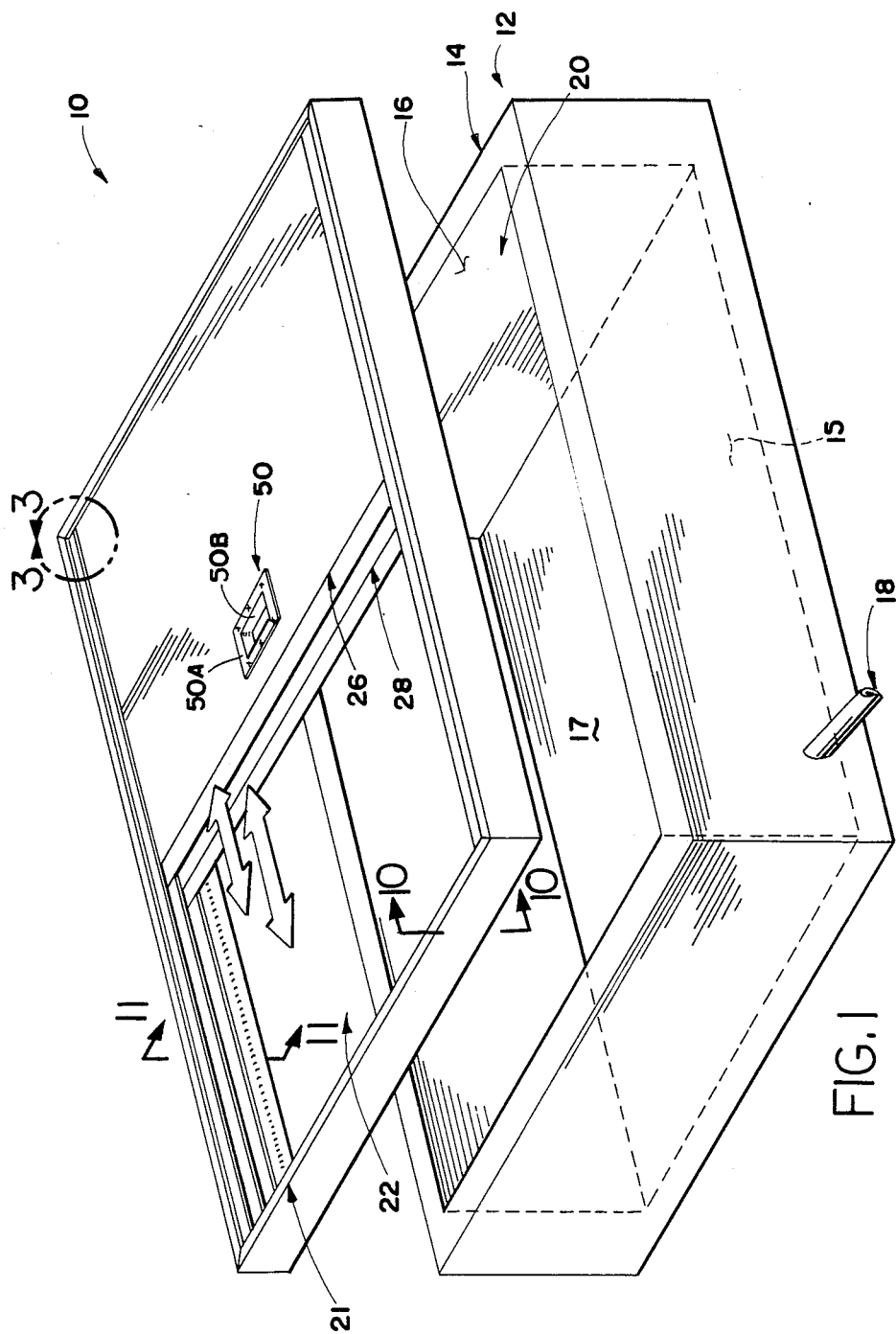
FIG. 1 is a three dimensional, perspective view of a food warmer including a food warmer container, and a cover unit constructed according to the principles of this invention, in unassembled conditions.

FIG. 1 illustrates a cover unit 10, constructed according to the principles of the present invention, and disposed so as to be insertable onto a food container 12. The food container 12 comprises a rectangular vessel 14 with a base 15, and upstanding walls 16 defining a chamber 17 for receiving a perishable food. Where it is desired to provide the vessel with an external source of heat, the base 15 and/or the walls 16 may include heating coils (not shown) and outlet means, shown schematically at 18, can be used for connecting the heating coils to a source of electricity. The base 15 and the walls 16 may also include insulation (not shown) for minimizing heat loss through the base and the walls.

As seen in FIG. 1, the walls 16 of the food container 12 extend upward from the base 15, and define a rectangular access opening 20 at the top of the food container 12. The cover unit 10 is designed to mate with the food container 12 in a way that enables the rectangular access opening 20 at the top of the food container to be effectively sealed against heat loss, and which enables selective access to the container 12 when it is desired to remove food from the container 12.

The cover unit 10 includes a metal frame member 21 defining a rectangular opening 22, and having a peripherial, downwardly extending, rectangular skirt 24 (see FIG. 2). Further, the cover unit 10 includes upper and lower doors 26, 28 supported on the frame 21, and independently slidable relative to the opening 22 and relative to each other, to allow selective access to the interior of the container 12, through the opening 22 in the frame member 21.

When the cover unit 10 is assembled with the food container 12, the peripheral, downwardly extending skirt 24 on the frame 21 is dimensioned to mate with the upper interior parts of the walls 16 of the container, as illustrated in FIG. 2. When the upper and lower doors 26, 28 are in the positions illustrated in FIG. 2, they combine to close the opening 22 in the frame 21, and, together with the frame 21, effectively seal the access opening 20 in the food container.

The frame 21 is constructed by a pair of sheet metal frame members 21A, each of which is constructed in the manner illustrated in FIGS. 4-6. As illustrated in FIG. 4, each sheet metal frame member 21A has a longitudinal central portion 21B, and a pair of transverse end portions 21C, each extending perpendicular to the longitudinal central portion 21B. Each sheet metal frame member 21A is formed from a sheet of flat metal stock, shown in FIG. 5, with V-shaped grooves 30, 32 to allow the flat sheet of metal stock to be bent to form the corners of the frame member 21A. When a frame member 21A is bent into its final profile, its cross section includes a U-shaped groove 34 and the downward skirt 24 (see FIGS. 2, 6, 10 and 11).

In forming the frame 21, two frame members 21A, each constructed in the manner shown in FIGS. 4-6, are formed into the rectangular frame with their central portions 21B forming parallel, longitudinal sides of the frame, and their transverse portions 21C welded together to form transverse sides of the frame. Further, a reinforcing member 40 is connected with each transverse side of the frame. Each U-shaped reinforcing member is made of sheet metal that is bent to the U-shaped profile (see FIGS. 3 and 10). Further, each U-shaped reinforcing member 40 is dimensioned to fit tightly within the U-shaped groove 34 formed in the frame (see FIG. 10). Moreover, the base portions of each U-shaped reinforcing member 40 is spot welded to the base portion of the U-shaped groove 34 in the frame at several points in order to fix those members together.

A track member 42 is provided along each longitudinal side of the frame 21. Each track member 42 comprises an E-shaped metal member defining respective longitudinally extending upper and lower slots, each for receiving the end of a respective door member. The E-shaped track members 42 are received in the U-shaped grooves 34 along each longitudinal side of the frame (see FIGS. 3 and 11). The E-shaped track members 42 are dimensioned for a relatively tight fit in the U-shaped grooves 34 in the frame 21, so that the E-shaped track members 42 are effectively retained in the grooves 34 during assembly of the cover unit, and can be manually pulled from the grooves during disassembly of the cover unit. The E-shaped track members 42, when connected with the parallel longitudinal sides 21B of the frame 21, open towards each other and define longitudinally extending upper guides for the upper door member 26 and lower guides for the lower door member 28.

Each E-shaped track member 42 is formed by a U-shaped channel member 44 and an L-shaped angle member 46 welded to each other, in the orientation illustrated in FIGS. 3 and 11, to form the E-shaped channel member. The U-shaped channel member 44 and the L-shaped angle member 46 are preferably made of sheet metal which has been bent to the disclosed profiles. The longitudinal ends of the legs of the shaped track members 42 are preferably rounded, as illustrated in FIG. 3.

Each of the door members 26, 28 is also constructed essentially of sheet metal parts. Both of the door members are identical in construction, and FIGS. 7-9 illustrate the preferred construction of the door member 26. The door member is formed from (i) an outer door part 26A comprising a flat sheet metal member 26B with a bent flange 26C extending around its periphery, and (ii) an inner door member 26D comprising a flat sheet metal member 26E with a bent flange 26F extending about its periphery. The corners of the sheet metal members 26B and 26E, are cut so that the flanges 26C and 26F can be conveniently bent from the flat sheet members, with the flanges 26C and 26F extending normal to the planes of their respective sheet metal members.

The outer and inner door parts 26A and 26D are assembled together with the peripheral flange 26C of the outer door part 26A overlapping the peripheral flange on the inner door part 26D, as illustrated in FIG. 8. Further, as also illustrated in FIG. 8, the inner and outer door parts are welded together along their corners, at the junctions of their respective flanges, in order to secure the inner and outer door parts together. The outer door part 26A includes a rectangular opening (not shown), which receives a hand grip 50 for enabling a user to grasp the door member, in order to slide the door member in its track member. The hand grip 50 comprises a sheet metal member having a flat peripherial flange 50A which is welded to the sheet metal member 26B, and a curved part 50B extending inward from the flange 50A when the flange is welded to the outer sheet metal member 26B. Finally, if desired an insulating material (other than air) can be disposed between the door parts during assembly.

As discussed above, the E-shaped track members 42 are not fixed to the frame 21. They are dimensioned for a relatively tight fit in the respective U-shaped grooves 34 along the longitudinal sides 21B of the frame (see FIG. 11), but are not fixed to the frame by any other means. The doors 26, 28 are dimensioned so they extend partly into the E-shaped track members 42, but not quite to the extreme end of the E-shaped track members. With the foregoing construction, the E-shaped track members 42 and the door members 26, 28 can be initially assembled as a subunit. The subunit can then be connected with the frame by inserting the E-shaped track members into the U-shaped grooves 34 in the frame 21. The cover unit is thus completely assembled, and the doors can slide in the E-shaped track members 42 in order to selectively open and close the opening 22 in the frame 21.

The relative dimensions of the frame 21, the E-shaped track members 42 and the doors 26, 28 enables the doors and the E-shaped track members 42 and the doors 26, 28 to be retained in the frame. The doors can be slid to virtually any position along the length of the frame, selectively to cover the access opening 20 in the container, or to allow access to the food in the container. In order to disassemble the cover unit, the doors 26, 28 are both slid to one end of the frame (i.e., see FIG. 1), and the E-shaped track members 42 are manually pried partially out of their grooves 34 at the other end of the frame 21. The E-shaped track members and door subunit is then easily removed from the frame, and the doors 26, 28 can then be separately removed from the track members 42, thus enabling the parts (the track members, the doors, and the frame) to be separately cleaned.

Further, as can be seen from the foregoing description, the essential parts of this invention are all comprised of sheet metal members (preferably stainless steel). Specifically, the door members comprise two sheet metal members and the sheet metal portions forming the hand grips. The E-shaped track members are each comprised of two bent sheet metal members, the frame comprises a pair of sheet metal members, and each of the reinforcing members comprises a bent sheet metal member. Such sheet metal pieces are relatively simple to construct and relatively simple to assemble into the cover unit. The only assembly feature other than manual interconnection of the parts is the welding of the door parts and of some of the sheet metal members together. Such construction provides a cover unit construction which is easy to assemble and disassemble, and which is effective to seal a food container, and to allow selected access to the food container.

With the foregoing description in mind, it is believed that various modification of the specific structure disclosed above will be readily apparent to those of ordinary skill in the art.

I claim:

1. A cover unit for a food warmer of the type comprising a food container; said cover unit comprising a frame for connection to the food container; said frame having an opening which is aligned with the access opening in the container and a plurality of door members slidably supported on said frame and independently moveable relative to said frame and to each other selectively to close said opening and to allow a selected amount of access to the food container through said opening; track means for supporting and guiding each of said door members; the track means for each of said door members comprising a pair of parallel, opposed tracks connected with the frame; each of said tracks being selectively removeable from said frame and being separable from said door members to enable disassembly of said frame, said tracks and said door members.

2. A cover unit as set forth in claim 1 wherein said frame has a pair of parallel sides with U-shaped grooves; each of said tracks comprising an E-shaped member dimensioned to be retained in a respective U-shaped groove in the frame; the pair of parallel tracks being dimensioned to retain and guide each of said plurality of door members for independent sliding movement relative to said frame and to each other.

3. A cover unit as set forth in claim 2 wherein said E-shaped members are dimensioned for a relatively tight fit in a respective U-shaped groove, so that the E-shaped members are frictionally held in place in the respective U-shaped grooves in said frame.

4. A cover unit as set forth in claim 3 wherein said frame, each of said tracks and each of said door members consists essentially of sheet metal parts.

5. A cover unit as set forth in claim 1 wherein said frame, said track and said door members consist essentially of sheet metal parts.

6. Apparatus for forming a cover unit for a food container, comprising a frame; a plurality of track members and a plurality of door members; said plurality of track members being engageable with said frame and said door members in a manner which slidably connects said door members with said frame when said cover unit is assembled, wherein said frame, both of said track member and said door members are separable from each other in order to disassemble said cover unit.

7. Apparatus as set forth in claim 6 wherein said frame, each of said track members and each of said door members consists essentially of sheet metal parts.

8. Apparatus as set forth in claim 7 wherein said frame includes a pair of parallel sides with U-shaped grooves; each track member comprises an E-shaped member dimensioned to be retained in a respective U-shaped groove in the frame; and each track member is dimensioned to retain and guide each of said plurality of doors for independent sliding movement relative to said frame and to each other.

9. A cover unit as set forth in claim 8 wherein each of said E-shaped members are dimensioned for a relatively tight fit in a respective U-shaped groove, so that the E-shaped members are frictionally held in place in the respective U-shaped grooves in said frame.

10. Apparatus as set forth in claim 9 wherein said frame, each of said track members and each of said door members consists essentially of sheet metal parts.

* * * * *